(12) United States Patent
Sumner et al.

(10) Patent No.: US 11,520,925 B1
(45) Date of Patent: Dec. 6, 2022

(54) PRIMARY ACCOUNT NUMBER SECURITY IN THIRD PARTY CLOUD APPLICATIONS

(71) Applicant: Wells Fargo Bank, N.A., San Francisco, CA (US)

(72) Inventors: Daniel S. Sumner, Matthews, NC (US); Hemesh Yadav, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 233 days.

(21) Appl. No.: 16/908,246

(22) Filed: Jun. 22, 2020

(51) Int. Cl.
*G06Q 20/34* (2012.01)
*G06F 21/62* (2013.01)
*H04L 9/40* (2022.01)

(52) U.S. Cl.
CPC ...... *G06F 21/6245* (2013.01); *G06F 21/6227* (2013.01); *H04L 63/02* (2013.01)

(58) Field of Classification Search
CPC ... G06F 21/6245; G06F 21/6227; H04L 63/02
USPC .......................................................... 726/26
See application file for complete search history.

(56) References Cited

U.S. PATENT DOCUMENTS

| | | | |
|---|---|---|---|
| 8,651,374 B2 | 2/2014 | Brabson et al. | |
| 9,887,975 B1 | 2/2018 | Gifford et al. | |
| 10,262,128 B2 | 4/2019 | Bomar et al. | |
| 2015/0096038 A1* | 4/2015 | Mattsson | H04L 9/0637 726/26 |
| 2018/0300716 A1 | 10/2018 | Carlson | |
| 2019/0228404 A1* | 7/2019 | Wang | G06Q 20/204 |
| 2020/0034832 A1 | 1/2020 | Korpal et al. | |

FOREIGN PATENT DOCUMENTS

WO    99066428    12/1999

OTHER PUBLICATIONS

Lane, "Understanding and Selecting Data Masking Solutions: Creating Secure and Useful Data," Securosis, Version 1.0, Aug. 10, 2012, 33 pp.
Modi et al., "A survey on security issues and solutions at different layers of Cloud computing," Springer, DOI 10.1007/s11227-012-0831-5, Oct. 2012, 32 pp.
Sondhi et al., "Voltage Securedata," Coalfire, Oct. 9, 2017, 56 pp.

* cited by examiner

*Primary Examiner* — Jeffrey C Pwu
*Assistant Examiner* — Nega Woldemariam
(74) *Attorney, Agent, or Firm* — Shumaker & Sieffert, P.A.

(57) ABSTRACT

Techniques are described that eliminate storage of primary account numbers (PANs) by third-party cloud applications executed in external networks. An example method includes receiving a query from an external network that includes a card reference number (CRN) and converting the CRN into a primary account number (PAN). The method includes modifying the query to include the PAN in place of the CRN and performing a service call to retrieve a record responsive to the query from a master account database using the PAN. The method includes, when the record includes the PAN, converting the PAN into the CRN via the tokenization server. Additionally, the method includes adding the record with the CRN to a query response and transmitting the query response to the external network.

18 Claims, 6 Drawing Sheets

PRIMARY ACCOUNT NUMBER SECURITY IN THIRD PARTY CLOUD APPLICATIONS

TECHNICAL FIELD

This disclosure relates to communication between external third-party servers and internal servers.

BACKGROUND

Primary account numbers (PAN) are unique identifiers that are associated with an account within a financial institution (e.g., a bank account, a credit card account, etc.). For example, a PAN may be a credit card number embossed on a credit card and encoded on a magnetic strip and/or in a chip. PANs may be the primary number associated with an account. That is, to access an account, even in a non-transaction context, the PAN may be used as an index to the account information. Generally, a PAN has payment authority meaning that by providing a PAN during a transaction, a payment network will process the payment and perform the steps necessary to charge or deduct from the customer account and credit payment to the vendor account. This means, however, a malicious actor that gains access to a PAN may perform transactions while the PAN is still valid. As such, when PANs are stored on servers in datacenters, there are stringent security requirements to protect the PANs from being accessed by a malicious actor.

SUMMARY

In general, this disclosure describes techniques to eliminate storing primary account numbers (PANs) by applications executing in third-party cloud applications. PANs are unique account numbers with payment authority. Each PAN is associated with an account that is associated with a customer. Often PANs are used proxies for unique customer identifiers. Card reference numbers (CRNs) are tokens that are proxies for unique customer identifiers that do not have payment authority. In accordance with the techniques described herein, each possible PAN is associated with a unique CRN such that there is not a mathematical relationship between the PAN and the corresponding CRN. To support legacy applications, financial institutions may support both PANs and CRNs in applications executing in an internal data center controlled by the financial institution. For example, accounts in a master account database (sometimes referred to as a "system of record" or "SOR") may be indexed by a PAN or a CRN depending on how the account was created. As described below, cloud applications external to the financial institution's data center exclusively use and store CRNs. When the cloud application needs to update account details stored in the master account database (e.g., during nightly reconciliation, etc.), the cloud application sends a query including CRNs and, upon receipt by the internal data center, some CRNs (e.g., CRNs that are not contained in the master account database, etc.) included in the query are converted into PANs using a tokenization server. When the query results are transmitted from the internal data center back to the cloud application, any PANs in the results are converted into CRNs by a tokenization server before exiting the firewall of the internal datacenter. In such a manner, PANs are not stored outside of the firewall of the internal datacenter and, thus, are secure.

An example method includes receiving a query from an external network that includes a card reference number (CRN) and converting the CRN into a primary account number (PAN). The method includes modifying the query to include the PAN in place of the CRN and performing a service call to retrieve a record responsive to the query from a master account database using the PAN. The method includes, when the record includes the PAN, converting the PAN into the CRN via the tokenization server. Additionally, the method includes adding the record with the CRN to a query response and transmitting the query response to the external network.

An example system includes a first server and a second server. The first server executes an integration application. The integration application receives a query for account information from an application executing on an external network. The query including a card reference number (CRN). The integration application requests a first conversion of the CRN to an associated primary account number (PAN) and retrieves, via a service call, a record responsive to the query from a master account database using the PAN. The integration application requests a second conversion of the PAN into the CRN and transmit a query response to the external network; the query response including the record with the PAN replaced by the CRN. The second server, in response to the request for the first conversion of the CRN, converts the CRN into the associated PAN for use by the first server to generate the query results. Additionally, the second server, in response to the second conversion request of the PAN, converts the PAN in into the CRN for use by the first server to generate the query response.

An example computer readable medium comprises instructions that, when executed, cause one or more servers to receive, by an integration application, a query from an external network that includes a card reference number (CRN). The instructions also cause one or more servers to convert, via a tokenization server, the CRN into a primary account number (PAN). The instructions also cause one or more servers to modify, by the integration application, the query to include the PAN in place of the CRN and perform, by a service platform, a service call to retrieve a record responsive to the query from a master account database using the PAN. The instructions also cause one or more servers to, when the record includes the PAN, convert the PAN into the CRN via the tokenization server. The instructions also cause one or more servers to add the record with the CRN to a query response and transmit the query response to the external network.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
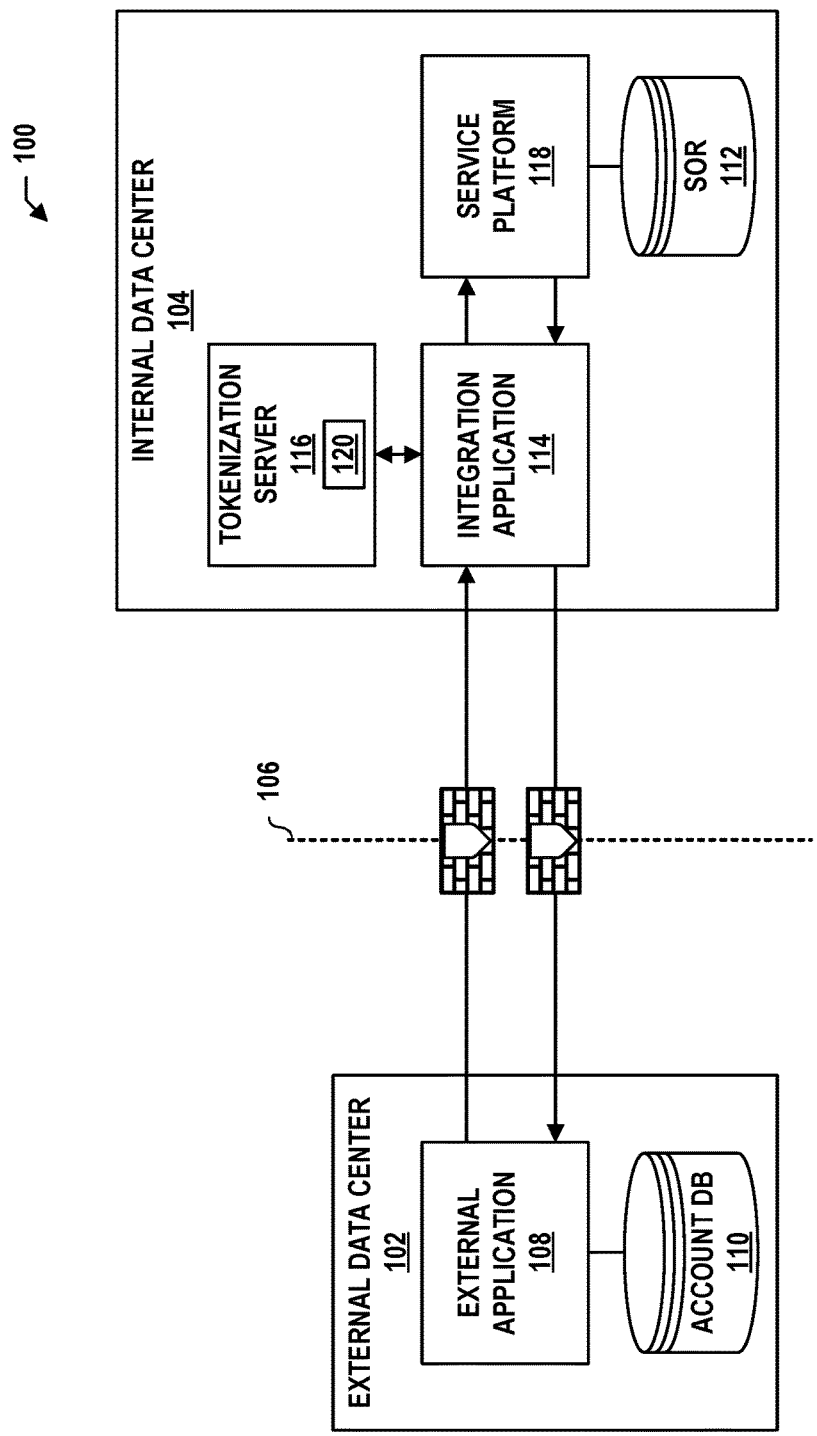
FIG. 1 is a block diagram illustrating an example system to securely handle requests for account information between an internal secure data center and an external third-party data center, in accordance with the teachings of this disclosure.

Primary account numbers (PANs) serve multiple purposes. PANs are used in conjunction with making payments via a payment network. For example, a PAN may be a credit card number used to facilitate payment between a merchant and a customer. As such, PANs can be desirable targets for malicious actors. Because PANs are associated with an account that is in turn associated with a customer, PANs are often used to index accounts. In such examples, a PAN may be used to query information about a customer and a customer's account. Such queries are often unrelated to performing a monetary transaction. A financial institution (e.g., a bank, a credit card company, a credit union, etc.) may have some banking applications executing on an in-house system (e.g., on servers at a data center operated and physically controlled by the financial institution). Increasingly, financial institutions develop and use banking applications executing on third party cloud environments (sometime referred to as "cloud applications"). For example, these cloud applications may be used for customer contact and marketing. However, because these cloud environments are not under the control of the financial institution, there is an increased risk of any database storing PANs being compromised.

As described below, in accordance with this disclosure, PANs are associated with card reference numbers (CRNs) by a stateless tokenization table. CRNs are unique identifiers that do not have payment authority (e.g., cannot be used to initiate a payment transaction). CRNs may be stored by cloud applications in lieu of PANs. However, to accommodate legacy internal applications and legacy accounts, some accounts are indexed in a master account database (sometimes referred to as a "system of record" or an "SOR") using the associated PAN. When a cloud application requires account details, the cloud application sends a query with the CRN associated with the account of interest to an integration application operating on a server hosted by a data center controlled by the financial institution. The integration application receives the query and determines whether the CRN is used to index an account in the master account database. If not, the integration application sends the CRN to a tokenization server that converts the CRN into the corresponding PAN. A service platform uses the CRN and/or PAN that are used to index the mater account database to retrieve the account details of interest. These results are sent to the integration application for transmission back to the cloud application the send the corresponding query. The integration application again uses the tokenization server to cause any PANs in the results to be converted to CRNs before being sent to the cloud application that sent the corresponding query.

In some examples, the tokenization server includes a master list of CRNs randomly generated for all possible PANs. In some such examples, for each possible PAN, a preliminary CRN is randomly generated such that there is no mathematical relationship between the PAN and the assigned preliminary CRN (sometimes referred to as "a secure stateless token"). In such examples, the preliminary CRN is encrypted (e.g., using a format preserving encryption version of the Advanced Encryption Standard (AES)). To generate the final CRN, the first digit of the PAN (e.g., the major industry identifier (MII)) replaces the first digit of the preliminary CRN and the last four digits of the PAN replace the last four digits of the preliminary CRN. In some such examples, the preliminary CRN is assigned to the PAN such that the final CRN is able to be validated using the same method used to validate the PAN (e.g., the Luhn algorithm, etc.).

As describe below, these techniques facilitate allowing some customer facing applications to execute in a cloud environment while reducing an attack surface presented to a malicious actor that may try to obtain PANs. Because PANs are contained within the internal datacenter of the financial institution (and, in some examples, only certain parts of the datacenter hosting the integration application and the service platform), network security techniques (such as, hardware-based isolation, software-based isolation, network protection, etc.) can be employed in a targeted and maintainable manner.

FIG. 1 illustrates an example system 100 to securely handle requests for account information between an external third-party data center 102 and an internal data center 104 in accordance with the teachings of this disclosure. In the illustrated example, the external third-party data center 102 and the internal data center 104 are separated by a firewall 106 that prevents unauthorized access to the internal network within the internal data center 104.

The external third-party data center 102 may provide flexible network computing services (e.g., servers, databases, networking, applications, etc.) (sometime referred to as "cloud services"). In the illustrated example, the external third-party data center 102 provides hardware and network infrastructure to execute one or more external applications 108 and provide for one or more databases (e.g., account database 110). In some examples, the external applications 108 are customer facing applications that provide services to customers. In some examples, the external applications 108 are third-party applications (e.g., provided as software-as-a-service) that offer specialized functions to, for example, financial institutions (e.g., marketing applications, customer relationship management (CRM) applications, etc.). Generally, financial institutions do not control security measures deployed by the external third-party data center 102. The external application 108 securely connects (e.g., using Secure Socket Layer (SSL) protocol, secure HTTP, etc.) to the internal data center 104 so the external application 108 is able to securely communicate (e.g., using encryption, etc.) to the internal network of the internal data center 104 though the firewall 106. To support the external application 108, the external third-party data center 102 includes an account database 110 that stores details of customers and customer accounts. In the illustrated example, the account database 110 includes card reference numbers (CRNs) for each customer. For example, a customer/operator may enter personal information (e.g., login credentials, name, social security number, last four digits of PAN/CRN, etc.) sufficient to retrieve the associated account record in the account database 110. From time-to-time, the account database 110 receives updates from a master account database (e.g., the system of record (SOR) 112) within internal datacenter 104.

The internal datacenter 104 provides a private network (e.g., servers, databases, networking, applications, etc.) for a financial institution. The financial institution is in network and physical control of the internal datacenter 104. The internal datacenter 104 is separated from external networks (e.g., the Internet, etc.) by the firewall 106 that regulates external access to the internal network of the internal datacenter 104. In the illustrated example, the internal datacenter 104 includes an integration application 114, a tokenization server 116, a service platform 118, and a system of record (SOR) 112.

The integration application 114 operates on a server of the internal datacenter 104. As described below, the integration application 114 receives account requests from the external application 108. The account request may include one or more CRNs associated with accounts of interest. The account request may also include one or more parameters specifying what items of account information the external application 108 is requesting. The integration application 114 determines which CRNs in the account request are to be untokenized (e.g., any CRNs in the account requests that are not used to index account information in the SOR 112, etc.). For example, some records in the SOR 112 may be indexed by a PAN because of the age of the account. The integration application 114 coordinates with the tokenization server 116 to detokenize the CRNs into PANs. The integration application 114 modifies the account request to include the PAN instead of the CRN. The modified account request forms a basis for a query (sometimes referred to as a "service call") to the service platform 118. The integration application 114 receives query results from the service platform 118 that may contain PANs. The integration application 114 coordinates with the tokenization server 116 to convert the PANs in the query results into CRNs. The integration application 114 modifies the query results from the service platform 118 to be sent as request results to the external application 108.

The tokenization server 116 converts PANs into CRNs and CRNs into PANs. While the illustrated example in FIG. 1 includes one tokenization server 116, the internal datacenter 104 may include multiple tokenization servers 116, each handling requests from a different external datacenter 102 and/or a different integration application 114 (e.g., associated with a different service within the internal data center 104). In some examples, tokenization server 116 converts between CRNs and PANs using tokenization/detokenization. Tokenization uses an algorithm to replace an original value (e.g., a PAN, etc.) with an undecipherable token (e.g., the original value is not mathematically discernable using the token). Detokenization uses an algorithm to restore the original value from the token. For example, the tokenization server 116 may use a format preserving encryption algorithm to tokenize and detokenize PANs and CRNs.

In some examples, the tokenization server 116 stores a stateless master table 120 that includes a PAN/CRN pair for each PAN that can possibly exist, even if it does not exist in the SOR 112. This master table 120 is stateless because once generated and communicated to the tokenization server 116, it does not need to be changed or updated (e.g., unless the structure of the PAN changes). In some examples, the tokenization server 116 initially generates the stateless master table 120 by (a) randomly generating preliminary CRNs, (b) encrypting the preliminary CRNs, and assigning the encrypted preliminary CRNs such that when the first digit of the assigned PAN replaces the first digit of the preliminary CRN and the last four digits of the assigned PAN replace the last four digits of the preliminary CRN, the final CRN is validatable using the same method used to validate the PAN (e.g., a service that would validate a PAN as part of its execution can also validate a CRN using the same algorithm).

Upon receiving a CRN, tokenization server 116 returns a PAN and vice versa to In some examples, the tokenization server 116 performs batch conversion. For example, the integration application 114 may receive a request from the external application 108 that contains multiple CRNs to be converted into PANs. In such examples, the integration application 114 may send all of the CRNs to be converted in one batch and tokenization server 116 may then return the corresponding PANs in one batch.

The integration application 114 and the tokenization server 116 are communicatively coupled via a secure connection. In some examples, the integration application 114 and the tokenization server 116 authenticate each other to form the secure connection using the mutual authentication secure sockets layer (MASSL) security protocol. Subsequently, the integration application 114 and the tokenization server 116 communicate using a secure communication protocol, such as secure HTTP (HTTPS). In some examples, the integration application 114 and the tokenization server 116 communicate using a data interchange format, such as JavaScript Object Notation (JSON) or Wf-XML.

The service platform 118 generates query results by querying the SOR 112 with query parameters formed from the service call from the integration application 114. The service call may include, for example, PANs and/or CRNS of accounts of interest and data fields within the SOR 112 that include account information of interest (e.g., credit limit, credit score, account balance, etc.). In some examples, the service platform 118 is a server that has exclusive access to the SOR 112 such that the service platform 118 has the authority to maintain (e.g., update, modify, etc.) the information within the SOR 112. Because the records in the SOR 112 may be indexed by PANs or CRNs, the query results may include records that contain PANs and records that contain CRNs.

Figure 2:
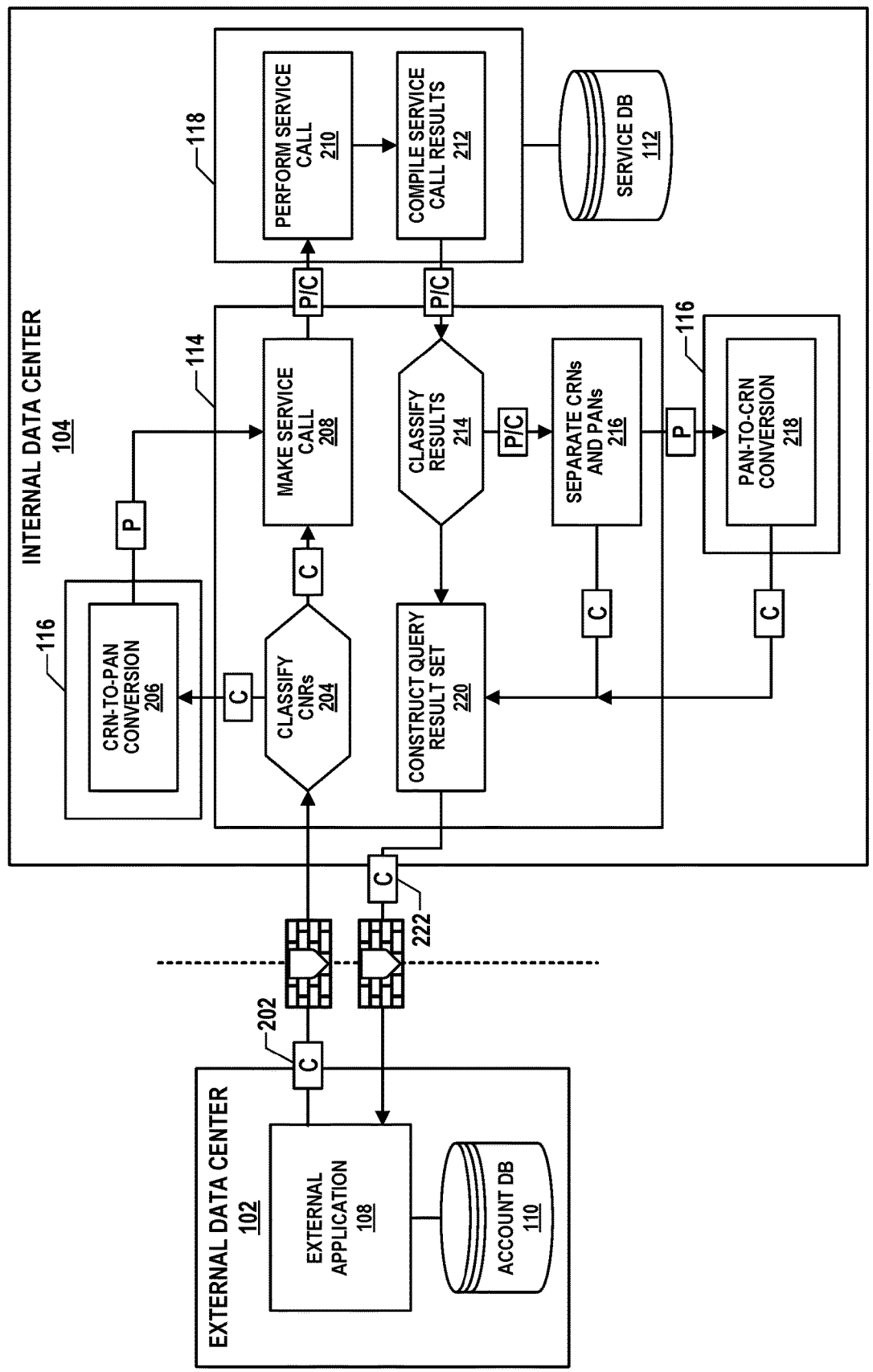
FIG. 2 is a conceptual diagram of the internal datacenter of FIG. 1 operating in accordance with the teachings of this disclosure.

FIG. 2 is a conceptual diagram of the internal datacenter 104 of FIG. 1 operating in accordance with the teachings of this disclosure. Initially, the external application 108 sends account information request 202 to the integration application 114. The account information request 202 includes one or more CRNs (noted as "C" in FIG. 2) associated with accounts of interest. For example, the external application 108 may request account information (e.g., current balance, credit limit, transaction history, etc.) that is stored by the service database 112 but not the account database 110. The integration application 114 receives the account information request 202 and determines whether the CRNs in the account information request 202 are used internally (e.g., whether the CRNs are used as an index to an account record in the service database 112) (204). For example, the integration application 114 may store a list of CRNs that are used to index to an account record in the service database 112. The CRNs that are not used internally are forwarded to the tokenization server 116 to convert the CRNs into PAN (206). For example, the tokenization server 116 may look up the PANs on a stateless master table (e.g., the stateless master table 120 of FIG. 1). The tokenization server 116 returns the PANs (noted as "P" in FIG. 2) associated with the CRNs to the integration application 114. The integration application 114 makes a service call to the service platform 118 based on account information request 202 substituting the PANs for the CRNs that are not internally used (e.g., the PANs received from the tokenization server 116) (208). The service call may include PANs and/or CRNS identified as being associated to accounts of interest by the account information request 202. The service call may also identify data fields within the SOR 112 that contain information identified by the account information request 202.

The service platform 118 performs a service call with the PANs and CRNs received from the integration application (210). To perform the service call, the service platform 118 queries the service database 112 with the PANs and CRNs. The queries may be structured to retrieve the information requested in the account information request 202. The service platform 118 compiles the results of the service call (212). Because some of the records in the service database 112 are indexed by CRNs and some are indexed as PANs, the service call results may also include both CRNs and PANs. The service platform 118 then forwards the service call results to the integration application 114.

The integration application classifies service call results based on service call results that only include CRNs and service call results that also include PANs (214). For service call results that include both CRNs and PANs (or just PANs), the integration application 114 separates a portion of the service call results with CRNs and a portion of the service call results with PANs (216). The PANs are transmitted to the tokenization server 116 and converted into the corresponding CRNs (218). The CRNs are used to construct a query result set 222 that includes the CRNs and the associated query results (220). The query result set 222 is then transmitted to the external application 108. The external application 108 then performs the function for which the query result set was generated. In such a manner, PANs that are used internally by the internal datacenter 104 are prevented from being sent to any external server (e.g., the external datacenter 102, etc.)

Figure 3:
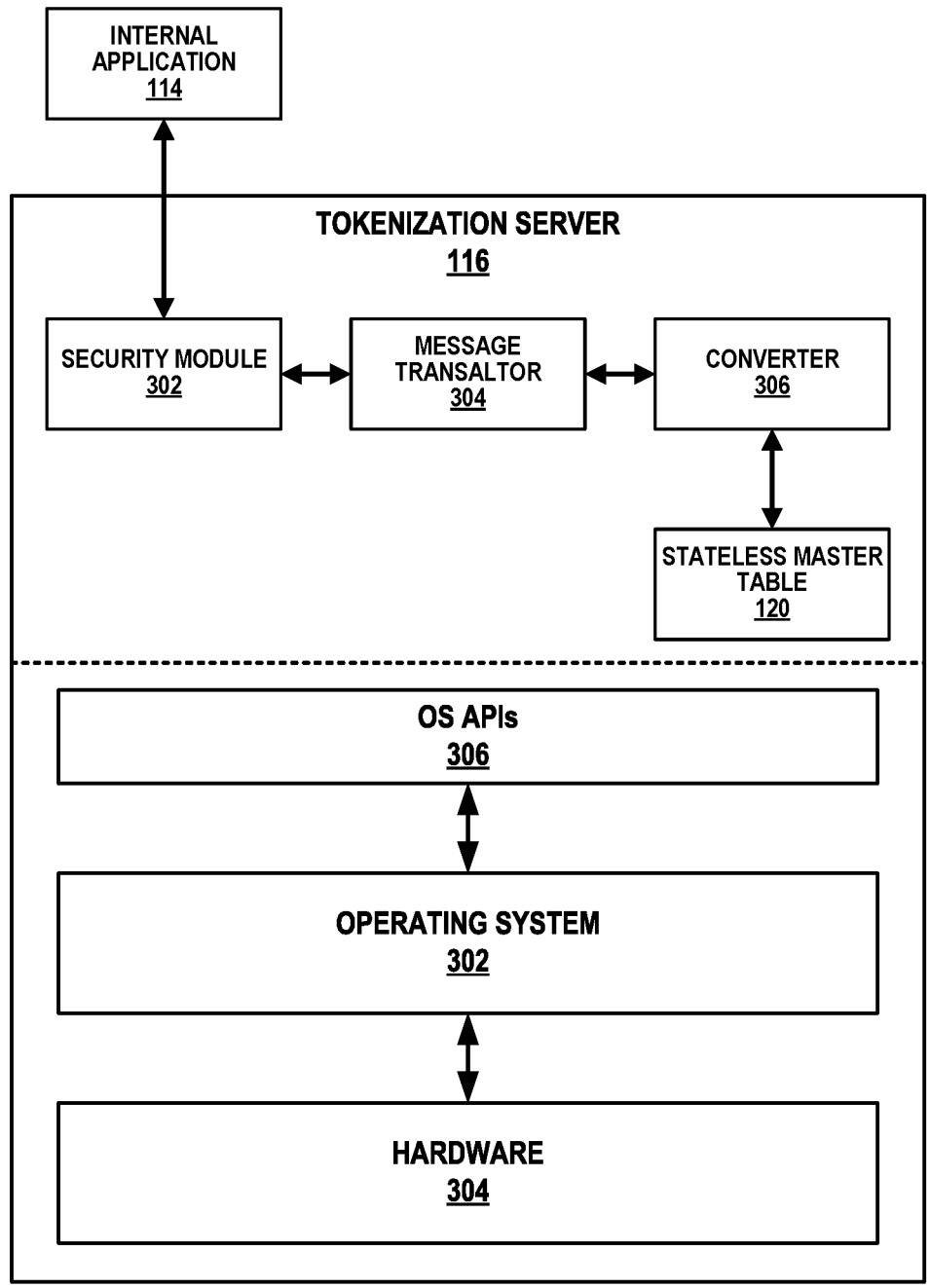
FIG. 3 is a block diagram of the tokenization server of FIG. 1 operating in accordance with the teachings of this disclosure.

FIG. 3 is a block diagram of the tokenization server 116 of FIG. 1 operating in accordance with the teachings of this disclosure. In the illustrated example, the tokenization server 116 device operating system 302 for controlling device hardware resources 304 (e.g., processor(s), memory, network interfaces, etc.) and managing various system level operations, operating system APIs 306 used as interfaces between the operating system 302 and a security module 308, a message translator 310, a converter 312, and the stateless master table 120. The security module 308 establishes a secure connection between the tokenization server 116 and the internal application 114. In some examples, the security module 308 and the internal application 114 communicate via the MASSL security protocol. The message translator 310 translates the format used by the internal application 114 (e.g., a WF-XML/JSON format) to a format used by the converter 306 (e.g., SOAP/XML, etc.). In some examples, the message translator 310 may translate the message containing the PANs or CRNs to convert into a query for the converter 306. The converter 312 queries one or more PANs (e.g., at step 206 of FIG. 2) or CRNs (e.g., at step 218 of FIG. 2) on the stateless master table 120. In some examples, the message translator 310 and the converter 312 may be operating on separate network appliances and be communicatively coupled via a secure protocol (e.g., the MASSL security protocol).

Figure 4:
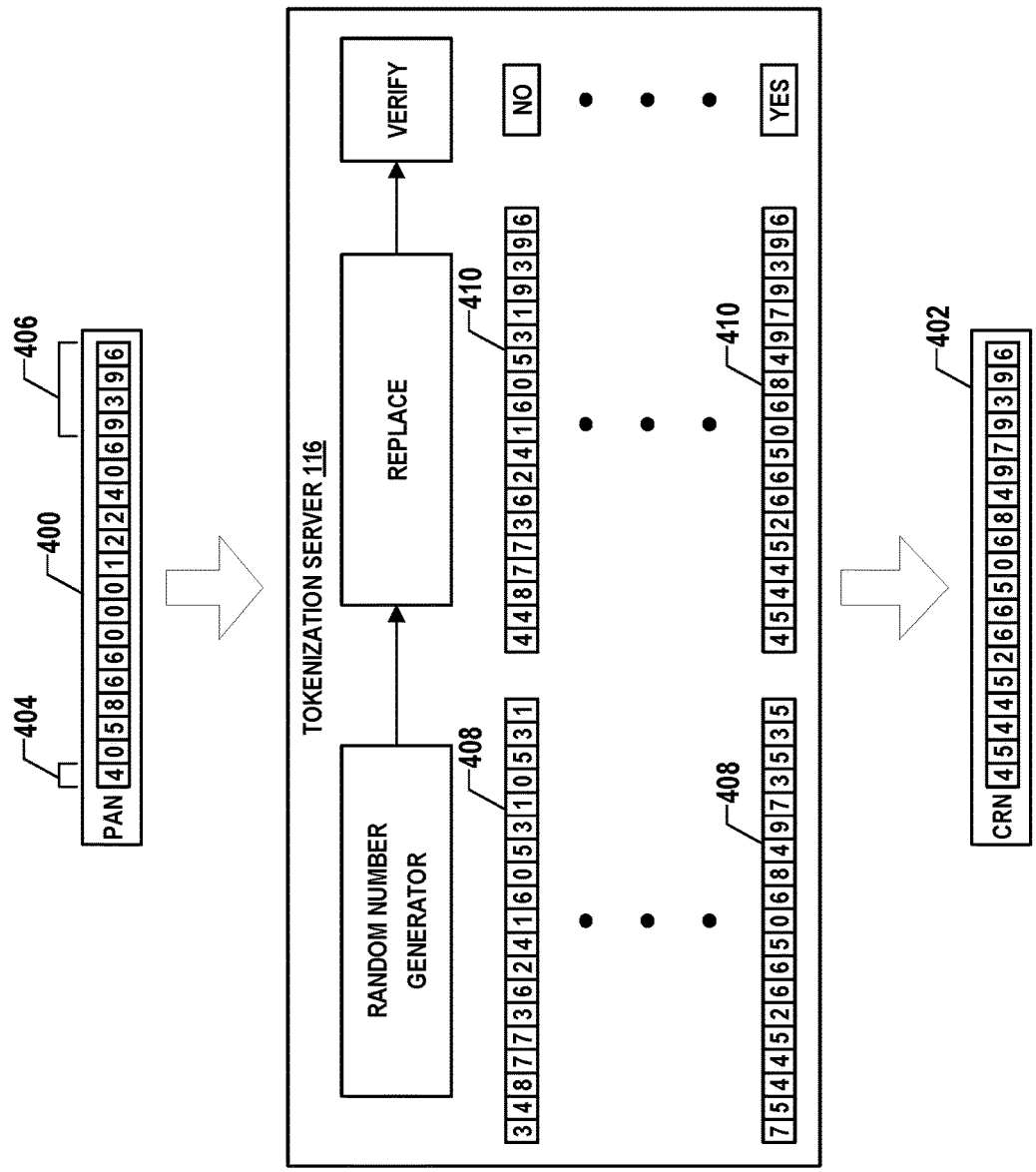
FIG. 4 is a conceptual diagram of converting a primary account number (PAN) into a card reference number (CRN), in accordance with the teachings of this disclosure.

FIG. 4 is a conceptual diagram of converting a primary account number (PAN) 400 into a card reference number (CRN) 402, in accordance with the teachings of this disclosure. The PAN 400 includes m-number of digits. In some example, the PAN 400 may include 13 digits. In some examples, the PAN 400 may include 19 digits. The first digit 404 of the PAN 400 (sometimes referred to as "the major industry identifier (MII)") and the last four digits 406 of the PAN 400 are used to generate the corresponding CRN 402. The tokenization server 116 utilizes a random number generator to generate random numbers 408 that may be used as a basis for the CRN. The generated random numbers 408 are mathematically unrelated to the PAN 400 (e.g., there exists no mathematical function to derive the PAN 400 starting from the random number). For example, all possible numbers (e.g., $10^{(m-1)}$ to $10^m-1$, etc.) may be generated and randomly assigned using a shuffle algorithm or any other suitable algorithm for randomly generating a large set of numbers. In some examples, the tokenization server 116 may generate multiple random numbers 408 for each possible PAN 400. The tokenization server 116 replaces the first digit of the random number 408 with the first digit 404 of the PAN 400 and the last four digits of the random number 408 with last four digits 406 of the PAN 400 to create a potential CRN 410. In some examples, the tokenization server 116 then checks to determine whether the potential CRN 410 can be verified by the same algorithm that is used to verify the validity of the PAN 400 (e.g., does not pass the Luhn algorithm, etc.). The tokenization server 116 generates a PAN/CRN pair for the stateless master table (e.g., the stateless master table 120) when a potential CRN is verifiable. In some examples, multiple potential CRNs 410 may be verifiable. In such examples, the tokenization server 116 may randomly select one of the potential CRNs 410 to pair with the PAN.

Figure 5:
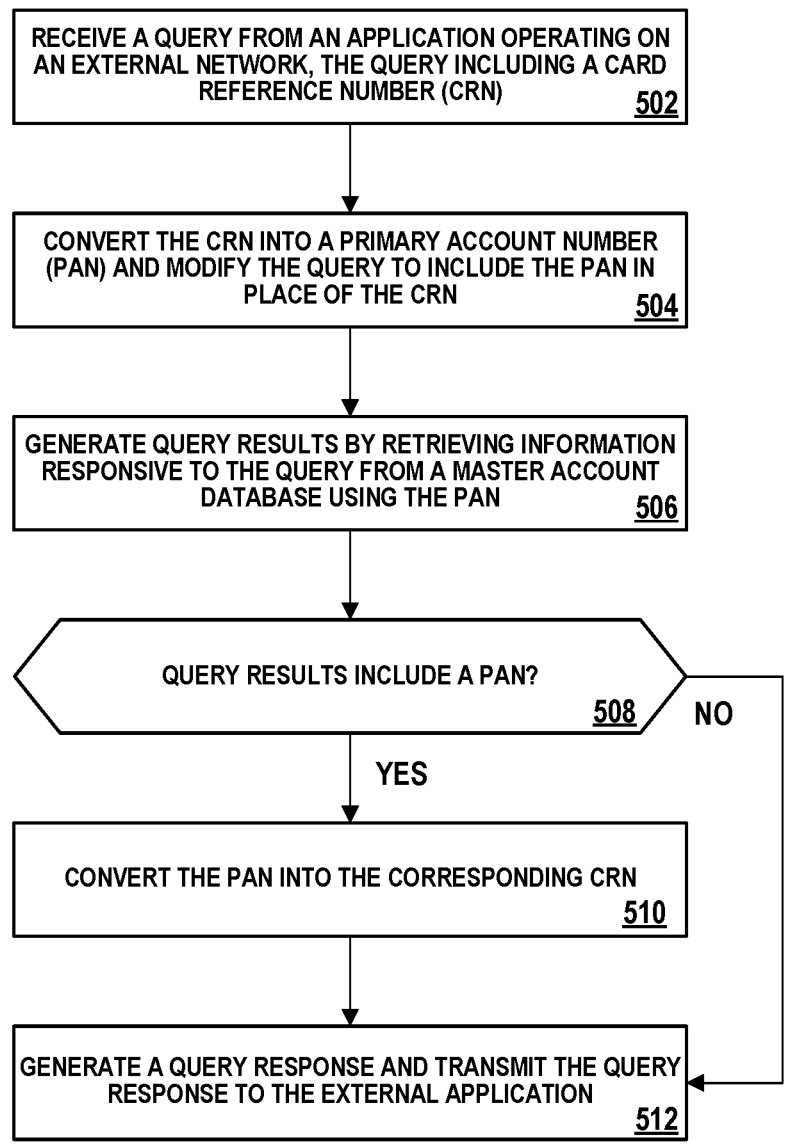
FIG. 5 is a flowchart illustrating an example operation for generating query results in response to a query generated by an external application operating in an external data center.

FIG. 5 is a flowchart illustrating an example operation for generating query results (e.g., the query results 222) in response to a query (e.g., the query 202) IN s generated by an external application (e.g., the external application 108) operating in an external data center (e.g., external data center 102). Initially, the integration application 114 receives a query 202 from an external application 108 operating on an external datacenter 102 that is separated by the internal data network 104 by a firewall (502). The query 202 includes a CRN. In some examples, multiple queries 202 may be received together that each include a different CRN. Because of the varied nature of accounts that are indexed with CRNs and PANs, some queries may require the CRN to be replaced and some queries may not need the CRN to be replaced. When the CRN is not used to index account information in the service database 112 (e.g., the CRN needs to be replaced with the corresponding PAN, etc.), the integration application 114 converts, via a tokenization server 116, the CRN into the corresponding PAN and modifies the query 202 to include the PAN in place of the CRN (504). The service platform 118 generates query results by retrieving information responsive to the query 202 from a master account database using the PAN (506). When the query results include a PAN (YES at 508), the integration application 114 converts, via a tokenization server 116, the PAN into the corresponding CRN (510). The integration application 114 generates query response 222 with the CRN instead of the PAN and transmits the query response 222 to the external application 108 (512). The query response 222 may be a compilation of multiple query results generated by multiple queries 202 that are received together. Some of the query results may include PANs and some may include CRNs. When the PANs are replaced by CRNs, the integration application 114 complies the query results and the modified query results into the query response 222. When the query results include a CRN (NO at 508), integration application 114 generates query response 222 with the CRN and transmits the query response 222 to the external application 108 (512).

Figure 6:
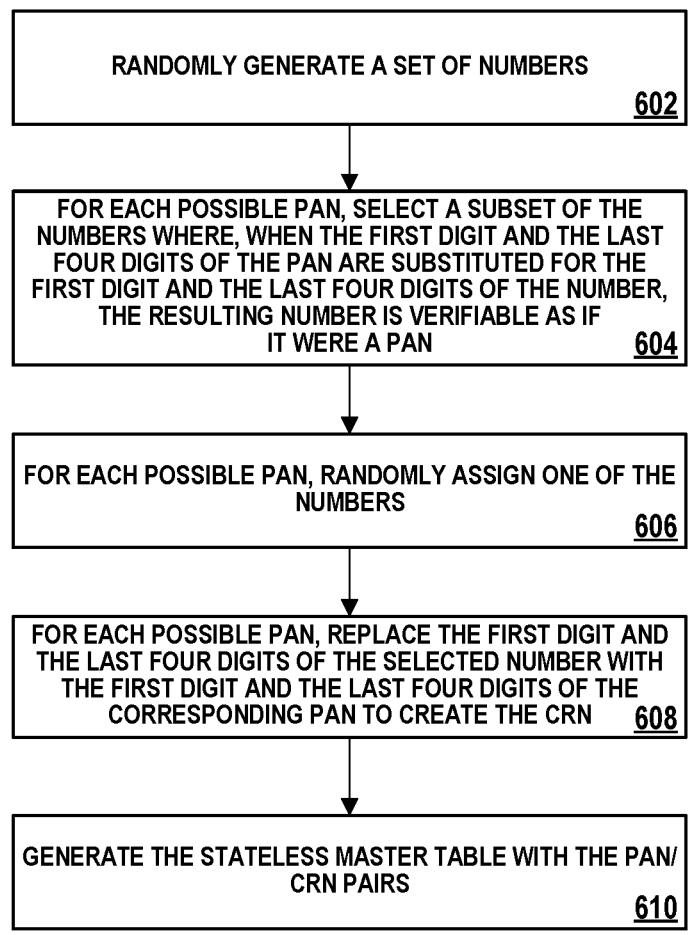
FIG. 6 is a flowchart illustrating an example operation for generating a stateless master table for conversion between a primary account number and a card reference number to facilitate securing handling requests for account information.

FIG. 6 is a flowchart illustrating an example operation for generating a stateless master table for conversion between a primary account number and a card reference number to facilitate securing handling requests for account information. Initially, the tokenization server 116 generates a large set of random numbers sufficient to at least provide one random number for each possible PAN (e.g., even PANs that are not used in server DB 112) (602). For each possible PAN, the tokenization server 116 selects a subset of the large set of random numbers where, for each number in the subset, when the first digit and the last four digits of the PAN are substituted for the first digit and the last four digits of the number, the resulting number is verifiable as if it were a PAN (604). For each possible PAN, randomly assign one of the numbers from the subset of numbers that are varifiable (606). For each possible PAN, replace first digit and the last four digits of the selected number with the first digit and the last four digits of the corresponding PAN to create the CRN (608). Generate the stateless master table with the PAN/CRN pairs. (610).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by an integration application executing on a server in a private network, a query from an external network that includes a card reference number (CRN);
converting, via a tokenization server, the CRN into a primary account number (PAN) based on a PAN-CRN pair stored in a stateless master table corresponding to the CRN and the PAN, wherein the CRN includes a randomly generated number encrypted such that a first portion of the PAN replaces a first portion of the randomly generated number and a second portion of the PAN replaces a second portion of the randomly generated number;
modifying, by the integration application, the query to include the PAN in place of the CRN;
performing, by a service platform, a service call to retrieve a record responsive to the query from a master account database using the PAN;
when the record includes the PAN, converting the PAN into the CRN via the tokenization server based on the PAN-CRN pair corresponding to the CRN and the PAN;
adding the record with the CRN to a query response; and
transmitting the query response to the external network.

2. The method of claim 1, wherein the plurality of PAN-CRN pairs includes PAN-CRN pairs for all possible PANs.

3. The method of claim 1, wherein the CRN is a tokenized version of the PAN that does not have payment authority.

4. The method of claim 1, further comprising:
upon receipt of the query, determining whether the CRN is valid; and
when the CRN cannot be validated, discarding the query.

5. The method of claim 1, wherein the CRN is a partial stateless token.

6. The method of claim 1, wherein converting the CRN into the PAN further comprises converting the CRN into the PAN only when the CRN is not used to index a record into the master account database.

7. A system comprising:
a first server in a private network executing an integration application configured to:
receive a query for account information from an application executing on an external network, the query including a card reference number (CRN);
request a first conversion of the CRN to an associated primary account number (PAN);
retrieve, via a service call, a record responsive to the query from a master account database using the PAN;
request a second conversion of the PAN into the CRN; and
transmit a query response to the external network; the query response including the record with the PAN replaced by the CRN; and
a second server configured to:
in response to the request for the first conversion of the CRN, convert the CRN into the associated PAN for use by the first server to generate the query results, the conversion based on a PAN-CRN pair stored in a stateless master table corresponding to the CRN and the PAN, wherein the CRN includes a randomly generated number encrypted such that a first portion of the PAN replaces a first portion of the randomly generated number and a second portion of the PAN replaces a second portion of the randomly generated number; and in response to the second conversion request of the PAN, convert the PAN in into the CRN based on the PAN-CRN pair corresponding to the CRN and the PAN for use by the first server to generate the query response.

8. The system of claim 7, wherein the plurality of PAN-CRN pairs includes PAN-CRN pairs for all possible PANs.

9. The system of claim 7, wherein the CRN is a tokenized proxy for the PAN that does not have payment authority.

10. The system of claim 7, wherein the first server is further configured to:

upon receipt of the query, determine whether the CRN is valid; and when the CRN cannot be validated, discard the query.

11. The system of claim 7, wherein the CRN is a partial stateless token.

12. The system of claim 7, wherein the first server is further configured to transmit the query to the second server when the CRN is not used to index a record into the master account database.

13. A non-transitory computer readable medium comprising instructions that, when executed, cause one or more servers to:

receive, by an integration application, a query from an external network that includes a card reference number (CRN);

convert, via a tokenization server, the CRN into a primary account number (PAN) based on a PAN-CRN pair stored in a stateless master table corresponding to the CRN and the PAN, wherein the CRN includes a randomly generated number encrypted such that a first portion of the PAN replaces a first portion of the randomly generated number and a second portion of the PAN replaces a second portion of the randomly generated number;

modify, by the integration application, the query to include the PAN in place of the CRN;

perform, by a service platform, a service call to retrieve a record responsive to the query from a master account database using the PAN;

when the record includes the PAN, convert the PAN into the CRN via the tokenization server based on the PAN-CRN pair corresponding to the CRN and the PAN;

add the record with the CRN to a query response; and transmit the query response to the external network.

14. The non-transitory computer readable medium of claim 13, wherein the plurality of PAN-CRN pairs includes PAN-CRN pairs for all possible PANs.

15. The non-transitory computer readable medium of claim 13, wherein the CRN is a tokenized version of the PAN that does not have payment authority.

16. The non-transitory computer readable medium of claim 13, wherein the instructions further cause the one or more servers to:

upon receipt of the query, determine whether the CRN is valid; and when the CRN cannot be validated, discard the query.

17. The non-transitory computer readable medium of claim 16, wherein a first portion of the CRN is the same as a corresponding first portion of the PAN.

18. The non-transitory computer readable medium of claim 13, wherein the instructions are further configured to cause the one or more servers to convert the CRN into the PAN only when the CRN is not used to index a record into the master account database.

* * * * *